United States Patent Office 3,508,959
Patented Apr. 28, 1970

3,508,959
NONCOAGULATING SURFACES
Robert H. Krahnke, Midland, Mich., assignor to Dow Corning Corporation, Midland, Mich., a corporation of Michigan
No Drawing. Continuation of application Ser. No. 558,620, June 20, 1966. This application Mar. 5, 1969, Ser. No. 808,716
Int. Cl. B32b *25/20;* C08j *1/44*
U.S. Cl. 117—138.8                          1 Claim

ABSTRACT OF THE DISCLOSURE

Materials whose surfaces have been sulfonated whereby the surfaces are rendered anticoagulative and as a result, do not predispose to clot formation when in contact with blood. Since silicone articles used as medical implants and the like are in continuous contact with blood, sulfonation of these articles would be particularly valuable to achieve the desired effects.

---

This application is a continuation of my application Ser. No. 558,620, filed June 20, 1966 which has been abandoned.

This invention relates to materials whose surfaces have been rendered anticoagulative and more particularly to surfaces which have been sulfonated and as a result do not predispose to clot formation when in contact with blood.

In recent years, the use of silicones in numerous applications have been widely accepted due to the remarkable advantages that can be obtained. The importance of silicones is most notably exemplified in the medical profession and the like. Since silicone is inert to human tissue, the body is able to tolerate silicone materials whereas the use of other foreign substances can lead to adverse effects. As a result, materials composed of silicone are in constant demand for use as implants and other like medical devices.

However, because blood tends to coagulate when it is in contact with silicone surfaces, the use of such a material has been severely handicapped in the past and hence, many conceivable benefits to be derived from the use of silicones have been necessarily abandoned.

To solve this problem, intense work has been initiated in this area, but unfortunately relatively slight progress has been achieved. For example, to prevent undesirable coagulation of the blood, heparin has been frequently employed as a coating on various materials which come into contact with blood to accomplish the required effect. Gott et al., Heparin Bonding on Colloidal Graphite Surfaces, Science, Dec. 6, 1963, vol. 142, No. 3597, pp. 1297–1298 reports that one can enhance anticoagulation by initially coating the substrate with colloidal graphite, to be followed by the application of a surface-active agent which lowers interfacial tension, and finally treating the substrate with a layer of heparin. This procedure is of little value since it has proven to be unsuccessful if the substrate is composed of silicone.

To date one of the few effective methods for bonding heparin to silicone surfaces so that they do not predispose to clot formation consists of exposing the heparinized silicone surface to ionizing radiation induced by a suitable source such as Cobalt 60. However, the costly expense and cumbersome procedures involved make this method inherently objectionable.

Thus, it is an object of the present invention to provide articles that do not predispose to clot formation when in contact with blood.

It is also an object of this invention to introduce articles whose surfaces do not predispose to clot formation without the necessity of a prior application of heparin.

It is a further object of the present invention to provide materials which do not predispose to clot formation when in contact with blood without resorting to a multi-step pretreatment of the substrate as was heretofore necessary.

It is still a further object of this invention to provide articles whose surfaces do not predispose to clot formation by methods and procedures which are considerably more feasible, practical, and economical than prior art practices.

Other objects and many of the attendant advantages of this invention will be readily appreciated as the same becomes better understood by reference to the following detailed description.

This invention relates to a device for use in contact with blood having on the surface thereof sufficient sulfo groups to render the surface of said device anticoagulative when in contact with blood.

By the term "sulfonating" as employed herein simply means that the surface of the substrate has been properly treated so that it consists essentially of sulfo groups having the general formula $SO_3X$ in which X is hydrogen, any lower alkyl radical, and any alkali metal or alkali earth metal such as sodium, potassium, calcium, and magnesium among others. It has been found that sulfonated surfaces of materials, e.g., surfaces having the above-defined sulfo groups attached thereto are not predisposed to clot formation when in contact with blood.

There are essentially two principal methods for sulfonating the devices of this invention, (1) by physically applying a sulfonated material to the surface of said device in some feasible fashion, or (2) by direct sulfonation of the device itself. In either method, the above-defined sulfo groups are effectively affixed to the surface of the device, and as a result the device is not predisposed to clot formation when in contact with blood.

Thus, one can achieve the desired sulfonation by reacting an organosilane of the general formula:

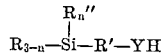

in which:

R is a hydrolyzable radical,

R' is a divalent hydrocarbon radical free of aliphatic unsaturation,

R" is a monovalent hydrocarbon or halohydrocarbon radical,

Y is selected from the group consisting of:

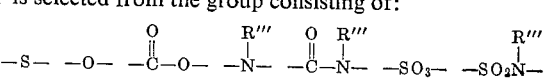

and

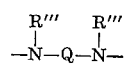

in which R''' is independently selected from the group consisting of hydrogen and aliphatic hydrocarbon radicals of from 1 through 6 carbon atoms, Q is an alkylene radical of from 2 through 4 carbon atoms that separates the two N atoms by at least 2 carbon atoms, and $n$ has a value of from 1 to 3 inclusive, with propane sulfone having the formula:

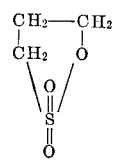

Thus, in the organosilane herein defined R can be any hydrolyzable radical. Hence, R can be any alkoxy radical of from 1 to 4 carbon atoms such as methoxy, ethoxy, propoxy, isopropoxy, butoxy, or isobutoxy; R can also be any halogen atom such as chlorine, bromine, iodine, or fluorine,. In addition, R can be any acyloxy radical such as acetoxy, propionoxy, butyroxy, or decanoxy, among others; R can also be an oxime radical of the formula $$(Z_2C\!=\!N\!-\!O\!-\!)$$

wherein Z is a hydrocarbon radical of from 1 to 4 carbon atoms such as methyl, ethyl, propyl, isopropyl, butyl, and isobutyl. Also, R can be any aryloxy radical such as phenoxy, anthryloxy, and naphthyloxy, among others.

As hereinbefore related, R' can be any divalent hydrocarbon radical free of aliphatic unsaturation such as methylene, ethylene, propylene, isopropylene, butylene, isobutylene, amylene, decylene, octadecylene, myricylene, phenylene, naphthylene, methyl phenylene, xylylene, and xenylene among others.

For purposes of this invention R'' can be any monovalent hydrocarbon or halohydrocarbon radical such as methyl, ethyl, propyl, isopropyl, butyl, isobutyl, decyl, dodecyl, octadecyl, myricyl, pentyl, isopentyl, hexyl, isohexyl, cyclohexyl, cyclobutyl, cyclohexenyl, vinyl, allyl, methallyl, beta-phenylpropyl, beta-phenylmethyl, phenyl, tolyl, xylyl, ethylphenyl, mesity, methylethylphenyl, n-propylphenyl, isopropylphenyl, diethylphenyl, pentamethylphenyl, amylphenyl, butylmethylphenyl, propylmethylphenyl, ethyltrimethylphenyl, diethylmethylphenyl, hexylphenyl, cyclohexylmethylphenyl, amylmethylphenyl, butylethylphenyl, butyldimethylphenyl, propylethylmethylphenyl, diphenyl, dipropylphenyl, naphthyl, 1-methylnaphthyl, 2-methylnaphthyl, 1-ethylnaphthyl, 2-ethylnaphthyl, phenylnaphthyl, antracyl, 9-methylanthracyl, 2,3-dimethylanthracyl, 2,4-dimethylanthracyl, 9-ethylanthracyl, phenanthryl, 3-methylphenanthryl, 1,4-dimethylphenanthryl, chloromethyl, chlorobutyl, chlorobenzyl, iodo-β-phenylpropyl, bromopropyl, 3,3,3-trifluoropropyl, gamma-chloropropyl-(perfluoroethyl)ethyl, iodophenyl, α,α,α-trifluorotolyl, perfluorocyclohexenyl, (perfluorotolyl)ethyl, (perfluorononyl)ethyl, (perfluoropentyl)ethyl, bromophenyl, bromotolyl, m-bromotolyl, p-bromotolyl, o-chlorotolyl, m-chlorotolyl, p-chlorotolyl, 2-chloro-m-fluorotolyl 2,6-dichlorotolyl, 4-bromo-o-tolyl, 4-bromo-o-xylyl, dichloroxylyl, 5-bromo-m-xylyl 2-bromo-p-xylyl, 2-bromomesityl, 2-bromo-o-tolyl, 2-bromo-1-ethylphenyl, 4-bromo-1,3-diethylphenyl, 6-bromo-3-ethyltolyl, 2-bromo-4-ethyltolyl, 4-bromo-1-propylphenyl, 4-bromo-1-isopropylphenyl, 4-bromo-1-methyl-3-isopropylphenyl, 4-bromo-1 - tertiarybutylphenyl, 4 - bromo - 1 - tertiary - amylphenyl, chlorophenyl, α-bromophenyl, β-bromophenyl, 2-chloronaphthyl, 1-bromo-3-chloronaphthyl, 2-chloro-1-methylnaphthyl, 1-bromo-8-methylnaphthyl, 1-bromo-2,3-dimethylnaphthyl, 1-bromo-4-methylnaphthyl, 1,10-dibromoanthracyl, and 9,10-dichloroanthracyl, among others. R''' can be hydrogen or any monovalent aliphatic hydrocarbon radical of from 1 through 6 carbon atoms such as methyl, isopropyl, hexyl, cyclohexyl, etc., and Q can be any divalent alkylene radical of from 2 through 4 carbon atoms that separates the two N atoms by at least two carbon atoms such as ethylene, propylene, isopropylene, butylene, etc.

As hereinbefore related, n has a value of from 1 to 3 inclusive therefore, the organosilanes of this invention must contain at least 1 hydrolyzable radical and can contain 2 or as many as 3 said radicals. As noted, when the organosilanes contain less than 3 hydrolyzable radicals, the remaining free valences of the silicon atom are satisfied by the R radicals as herein illustrated.

The above reaction is carried out in the presence of an equimolar amount of XOH wherein X is an alkali metal or alkali earth metal and a compound of the formula:

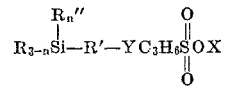

is obtained wherein X is as stated and Y is as above defined. It is of importance to note that the reaction is exothermic and thus, occurs at room temperature. To control the vigorous exotherm, the reaction is conducted in an ice bath or in the presence of a low-boiling hydrocarbon solvent, ether, or alcohol. Due to their low-boiling character and because of commercial availability, the exotherm is most efficiently controlled by conducting the reaction in the presence of methanol or isopropanol.

It is of further importance to note that the compounds defined are preferably employed in conjunction with a silicone substrate. Hence, sulfonation is effected simply by contacting a silicone material with the organosilane defined above having the formula:

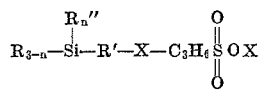

wherein X and Y are as above defined and thereafter curing the mixture.

By the term "silicone" as employed above is merely meant any organopolysiloxane material well known in the art. Hence, the term "silicone" in this invention includes silicone resins, silicone rubbers, and the like. Since the art is replete with references relating to the compositions and methods of manufacturing such materials, further enumeration of the silicones employed herein is deemed unnecessary.

By the term "contacted" as employed herein is meant that the sulfonate reactants can be mixed, milled, reacted, or applied to the silicone material in any manner or means most suitable at the time as long as the article contains a sufficient amount of sulfo groups on its surface. A method for contacting the operable ingredients which is particularly effective constitutes dispersing the sulfonate reactant in a solution of the silicone material and thereafter curing the combination whereby the ultimate material is not predisposed to clot formation when in contact with blood.

Another method of contacting the ingredients comprises dusting the sulfonate reactant (powdered) on the surface of the uncured or partially cured silicone material. The dusting operation can be done by any common and obvious technique such as brushing, dabbing, etc. When the silicone material is in its uncured or partially cured state, a tacky surface is afforded to which the powdered sulfonate reactant readily adheres. After the ingredients are thus contacted, the material is cured and the surface of the cured material does not predispose to clot formation when in contact with blood. Although numerous methods can be employed to sulfonate the surface of the appropriate device, the former method noted above is to be preferred.

The relative amounts of the ingredients used is not critical with the exception that there must be a sufficient amount of the sulfonate reactant present to insure an adequate quantity of sulfo groups on the surface of the substrate to impart the desired effect. However, it has been found that about 10 percent by weight of the sulfonate reactant is sufficient to achieve this effect. The choice of catalyst or temperature of cure is likewise not critical. Any type of catalyst or any temperature of cure well known in the silicon art can be employed in preparing the silicone materials of this invention absent deleterious results.

Alternative methods for obtaining the sulfonated silanes defined in the above method can be found in British Patent No. 1,030,888, and is hereby specifically incorporated by reference.

Another method for sulfonating the surfaces of the materials of this invention comprises applying thereto an organosilicon compound containing at least one unit of the formula:

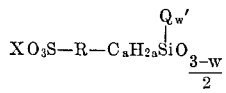

in which:

X is as previously defined,
R is a divalent aryl radical,
Q' is a monovalent hydrocarbon radical, halohydrocarbon radical, or hydrolyzable radical,
w has a value of from 0 to 3 inclusive, and
a is an integer of from 2 to 4.

The above compositions and species related thereto can be prepared by known methods, e.g., U.S. Patent 2,968,643, or by hydrolyzing the product of Canadian Patent 714,570.

Other potential methods for sulfonating the materials of this invention can comprise grafting organic compounds containing olefinic unsaturation and sulfo groups through a free radical initiation method such as by ionizing radiation with Cobalt 60 or the like, or a peroxide catalyst among others.

As hereinbefore related sulfonation of the devices of this invention can also be accomplished by direct sulfonation of the article, hence substrates such as polystyrene or poly(styrenebutadiene) can be directly sulfonated in any known manner, e.g., by directly immersing the appropriate article in a solution of sulfur trioxide at room temperature for a short period of time. Substrates so treated exhibit excellent anticoagulative effects when in contact with blood.

It is of importance to not that virtually any substrate can be sulfonated by the methods described herein. For example, if need be, the substrate can be first coated with primers such as $(OCH_3)_3Si(CH_2)_2NH(CH_2)_3NH$,

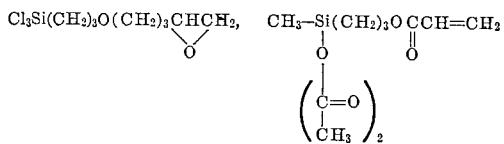

and $(CH_3CH_2O)_3SiCH_2CH_2SH$, among others, then appropriately sulfonated by the methods and with the various materials herein described. The above primers effectively adhere to known substrates and are readily reactive with the organosilicon compounds that impart the desired sulfo groups on the surface of the substrate.

Thus, substrates such as glass, metal, polyethylene, polypropylene, epoxy resins, natural rubber, acrylic resins, butadiene styrene rubber, ethylene propylene rubber, Teflon, Dacron, nylon, polycarbonate plastics, etc., properly treated, will not predispose to clot formation when in contact with blood.

As previously stated, in all of the illustrative methods related, it is only necessary that a sufficient amount of the sulfonate reactant be present to achieve the desired effect.

Articles that can be so constructed and treated for anticoagulant purposes include heart valve prosthesis, medical elastomers that are encapsulants for implanted electronic devices, elastomers for encapsulation of aneurysms, denture soft liners, denture base material, sponge subdermal implant material, mammary prosthesis, testicular prosthesis, rhinoplasty implants, scleral buckler designed for use with the Everett technique, reinforced and non-reinforced sheeting, silicone rubbers used to remedy defects following facial trauma, pads for limb prosthesis, rubbers for reconstruction of fractures, coronary arteries, Eustacian tube, medical grade tubing for perfusion and other blood handling procedures such as perfusion system blood lines and other pump circuitry, coiled capillary tubing membrane oxygenators for complete cardio-pulmonary bypass; also arterial venous shunts, abdominal drains, suction drainage of orthopedic wounds, catheters for intravenous administration of fluids for withdrawal of serial blood samples, for percutaneous flow-guided cardiac catheterization, continuous monitoring of blood glucose, intestinal decompression tubes, and for blood transfusions; also for various catheters and thoracic drains, among others.

Because of the recent interest which has developed in the replacement of human organs, a particularly suitable application of the present invention concerns the use of artificial hearts and the like. Since there is a continuous contact of blood on the surface of the artificial heart, silicone components used therein and treated in accordance with this invention are of extreme value.

The following examples are illustrative only and are not intended to limit the invention which is properly delineated in the claims.

EXAMPLE 1

4.0 grams of sodium hydroxide was dissolved in 50 grams of $CH_3OH$. To the mixture was added 19.6 grams of $(CH_3O)_3SiC_3H_6SH$. When the above solution was appropriately cooled, 12.2 grams of propane sulfone was added over a period of 15 minutes. A precipitate resulted which was filtered off by suction and washed several times with acetone. A powdered precipitate having the formula:

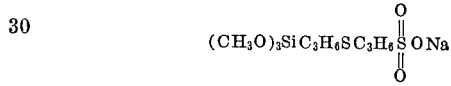

was obtained.

EXAMPLE 2

3.0 grams of a commercially available room temperature vulcanizable silicone elastomer in pentane was mixed with 0.3 grams of

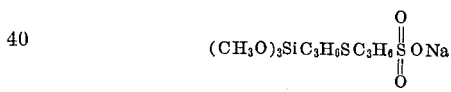

until a good dispersion was obtained. Test tubes were coated with the mixture, inverted, and allowed to stand overnight. Additional test tubes were coated with an identical elastomer with the exception that the

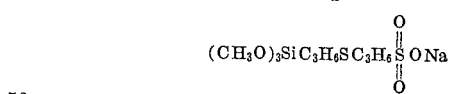

was not included. All of the tubes were then rinsed ten times and tests were then conducted by filling the test tubes with 0.9 ml. of citrated whole blood. The test tubes were then tipped every 30 seconds to determine clot time. The test tubes containing the

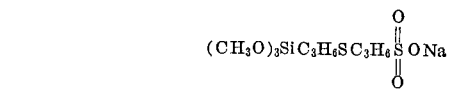

did not clot for a period of over 24 hours whereas those containing the elastomer alone clotted within 2.5 minutes.

EXAMPLE 3

Test tubes were coated with a commercially available heat curable silicone elastomer and partially cured so that a tacky surface was afforded. Powdered

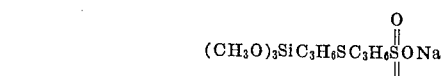

was then placed in the tube and the tube shaken so that the powder was evenly dispersed upon the elastomer. After testing for blood clotting as herein described, no clots were observed for a period of over six hours. Control tubes clotted within 3 minutes.

EXAMPLE 4

To 20 grams of a commercially available heat curable silicone elastomer was added 2.0 grams of powdered

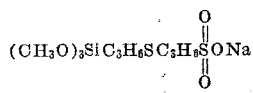

The above mixture was then milled in a mortar so that the powder would be evenly distributed throughout the mixture. The test tubes were then coated with the mixture and cured. No clots were observed for over six hours. Control tubes clotted within 3 minutes.

EXAMPLE 5

When the following sulfonates were substituted for the corresponding sulfonates of the above examples, equivalent results were obtained:

(A)
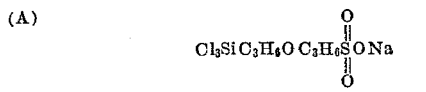

(B)
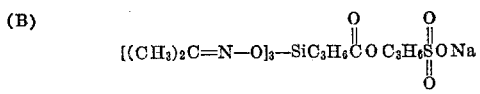

(C)
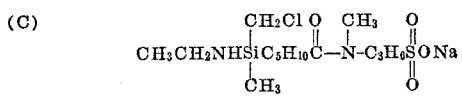

(D)
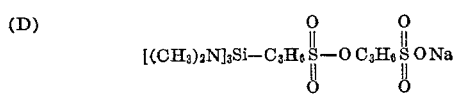

(E)
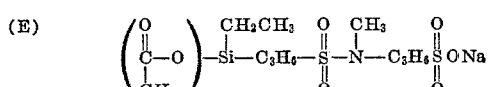

(F)
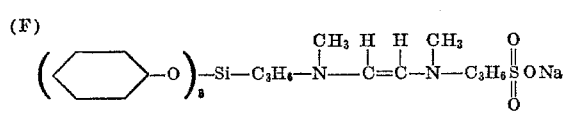

EXAMPLE 6

13.5 grams of

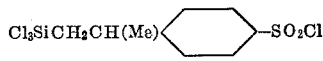

was shaken with 150 ml. of distilled water. The solid was filtered and then treated with boiling water for 3 days. The resulting solution was stripped to dryness, redissolved in distilled water, neutralized with dilute aqueous NaOH, and concentrated under vacuum to give 11.1 grams of

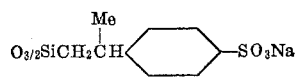

EXAMPLE 7

5.0 grams of a commercially available room temperature vulcanizable silicone elastomer in pentane was mixed with 0.5 grams of

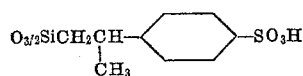

The above mixture was then coated on a test tube and allowed to cure overnight. Tests for blood clotting were then conducted as hereinbefore related. No clotting was observed for over 4 hours whereas the control clotted within 4 minutes.

EXAMPLE 8

A room temperature vulcanizable elastomer comprising 2.0 grams of a hydroxylated endblocked dimethylpolysiloxane having a viscosity of 12,500 cs. at 25° C., 6 drops of ethyl silicate, 1 drop of stannous oleate, and 0.2 grams of benzene sulfonic acid was blended together. 3 drops of a 10 percent commercially available catalyst in toluene was then added and test tubes were coated with the mixture. Clotting tests were conducted and no clots were observed for over 4 hours. The controls exhibited clotting within 3 minutes.

That which is claimed is:

1. A method for providing sulfo groups on the surface of a silicone rubber substrate comprising:

(A) coating a partially cured silicone rubber substrate with an organosilicon compound selected from the group consisting of an organosilane of the formula:

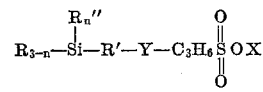

in which:

R is a hydrolyzable radical selected from the group consisting of an alkoxy radical of from 1 to 4 carbon atoms inclusive, a halogen atom, an acyloxy radical, an aryloxy radical, and an oxime radical of the formula ($Z_2C=N-O-$), in which Z is a hydrocarbon radical of from 1 to 4 carbon atoms inclusive.

R' is a divalent hydrocarbon radical free of aliphatic unsaturation,

R'' is a monovalent hydrocarbon or halohydrocarbon radical,

Y is selected from the group consisting of

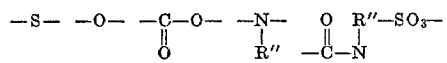

and

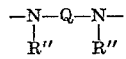

in which:

R''' is independently selected from the group consisting of hydrogen and aliphatic hydrocarbon radicals of from 1 to 6 carbon atoms inclusive, and Q is an alkylene radical of from 2 to 6 carbon atoms inclusive that separates the 2 N atoms by at least 2 carbon atoms, X is selected from the group consisting of an alkali metal and an alkali earth metal, and n has a value of from 1 to 3 inclusive, and an organosiloxane containing at least one unit of the formula:

(2) 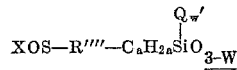

in which:

alkali metal and an alkali earth metal,
X is selected from the group consisting of an
R'''' is a divalent aryl radical,
Q' is selected from the group consisting of a monovalent hydrocarbon radical, a halohydrocarbon radical, and a hydrolyzable radical selected from the group consisting of an alkoxy radical of from 1 to 4 carbon atoms inclusive, a halogen atom, an acyloxy radical, an aryloxy radical, and an oxime radical of the formula $$(Z_2C=N-O-)$$

in which Z is a hydrocarbon radical of from 1 to 4 carbon atoms inclusive,
$w$ has a value of from 0 to 3 inclusive, and
$a$ is an integer of from 2 to 4.
(B) curing said coated silicon rubber substrate, whereby,
(C) said cured silicon rubber substrate is rendered anticoagulative when in contact with blood.

References Cited

UNITED STATES PATENTS 2,858,237   10/1958   Walles et al. ____ 260—448.2 X
3,187,033   6/1955   Nitzsche, Siegfried et al.
                                            260—448.2

WILLIAM D. MARTIN, Primary Examiner

D. COHEN, Assistant Examiner

U.S. Cl. X.R.

117—161